United States Patent [19]
Camosso

[11] 3,770,305
[45] Nov. 6, 1973

[54] DEVICE FOR CONVEYING FLUID INTO A ROTATABLE HOLLOW CASING

[75] Inventor: Domenico Camosso, Turin, Italy

[73] Assignee: RIV-SKF Officine di Villar Perosa S.p.A., Turin, Italy

[22] Filed: July 21, 1972

[21] Appl. No.: 273,910

[30] Foreign Application Priority Data
Aug. 3, 1971 Italy.................. 69612-A/71

[52] U.S. Cl.................. 285/110, 277/53, 285/190
[51] Int. Cl............................................ F16l 17/00
[58] Field of Search................ 285/190, 98, 13, 285/110; 277/53

[56] References Cited
UNITED STATES PATENTS

| 1,851,723 | 3/1932 | Neidow............................ 285/190 X |
| 2,565,791 | 8/1951 | Wagner et al................... 285/190 X |
| 2,459,643 | 1/1949 | Hartley............................ 285/190 X |
| 3,442,539 | 5/1969 | Randall........................... 285/190 X |

*Primary Examiner*—Thomas F. Callaghan
*Attorney*—Richard C. Sughrue et al.

[57] ABSTRACT

A device for conveying a fluid under high pressure to the interior of a hollow rotatable casing without losing fluid pressure is disclosed. The device comprises a fixed sleeve with respect to which the hollow casing is rotatable, there being a ball race at least at one end of the sleeve which is shaped, at that end, to form one of the tracks for the ball race. The hollow casing has at least one radial opening in the wall thereof and the sleeve has at least one corresponding opening axially adjacent the opening in the casing. The sleeve is formed at each end with inwardly directed radial shoulders which, together with an outward radial shoulder, or a ring forming the other track of the ball race, form a housing at each end for a flexible washer which covers the annular gap between inward shoulder and the ring or the outward shoulder. The flexibility of the washers allows them to press against the wall of the housing when the pressure increases due to the fluid flowing in under high pressure, and to seal the gap to prevent any loss of fluid or fluid pressure.

3 Claims, 3 Drawing Figures

DEVICE FOR CONVEYING FLUID INTO A ROTATABLE HOLLOW CASING

BACKGROUND OF THE INVENTION

The present invention relates to the problem of radially conveying a fluid under pressure in a hollow spinning casing.

Normally, this problem is solved by the use of rotating distributors of the type including a fixed sleeve surrounding the revolving hollow casing at least in the region of the fluid inlet thereof and fitted at its ends with fluid tight seals cooperating with the outer surface of the revolving hollow casing.

These known devices are most useful for the feeding of liquid and gaseous fluids, at low or medium pressures, where it is easy to obtain a satisfactory seal.

If on the other hand it is required to feed a fluid at very high pressure, particularly if it is fed for limited periods, then the problem of sealing becomes more acute since, in this case, all the parts of the distributor are suddenly and violently strained when the fluid is being fed.

The different parts of the distributor, apart from having to resist the sudden strain due to the arrival of the fluid under pressure, also have to resist the wear due to rotation of the movable hollow casing so that the efficiency of sealing is maintained during its working life.

OBJECTS OF THE INVENTION

One object of the present invention is to solve this problem, and to provide a device for the conveyance of fluid under pressure to a revolving hollow casing, which is capable of resisting the considerable strains due to a sudden influx of fluid under high pressure, and which resists the effects from wear to a high degree.

Another object of the present invention is to achieve a device of the type described which is simple, sturdy and economical to manufacture, easy to assemble and of high operational efficiency.

SUMMARY OF THE INVENTION

According to the present invention, there is provided a device for conveying fluid under pressure into a hollow rotatable casing, through at least one radial opening in the wall thereof, characterised in that it comprises a fixed sleeve to which the fluid under pressure can be fed through at least one radial opening in the wall thereof, the sleeve surrounding the said hollow casing and extending axially on either side of the said radial opening therein, at least one rolling element bearing at one end of the said fixed sleeve between the sleeve and the said hollow casing, and two flexible washers each loosely housed in a respective housing formed between the ends of the fixed sleeve and the hollow casing, the said washers being deformable when pressed against a wall of the housing as a result of an increase in pressure exerted by the ingress of fluid to the space between the fixed sleeve and the rotatable casing to prevent a loss of fluid at the ends of the sleeve.

Two embodiments of the invention will now be more particularly described, by way of example, with reference to the accompanying drawings, which is presented purely by way of non-restrictive example.

DESCRIPTION OF THE PREFERRED EMBODIMENT

Figure 1:
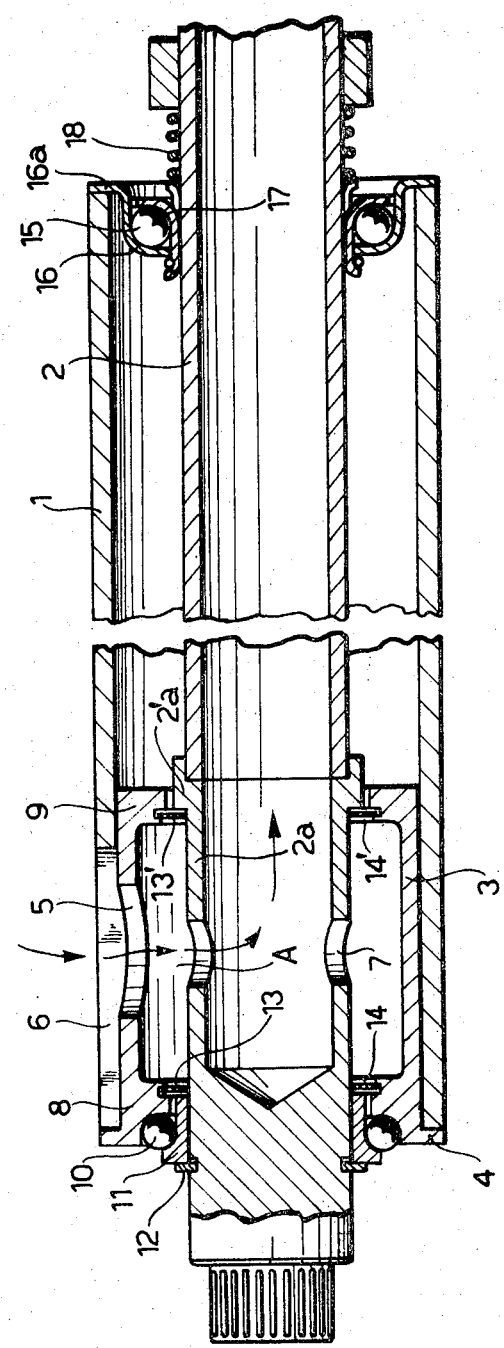
FIG. 1 is a diagrammatic axial section of one embodiment of the invention.

With reference to FIG. 1, there is shown a tubular casing 1 within which there is located, coaxially, a hollow rotatable tubular casing 2, into which a fluid under high pressure is to be fed.

At one end of the fixed casing 1 there is a sleeve 3 which is coaxial with the casing 2, and which has at one end an annular ridge 4 against which the casing 1 abuts. The sleeve 3 has at least one radial opening 5 located adjacent an opening 6 in the outer casing 1 through which the fluid under pressure is to be fed. Axially adjacent these openings the hollow rotatable casing 2 has radial openings 7 through which the fluid can flow into the interior thereof.

At each end of the sleeve 3 there are radially inwardly directed annular shoulders 8, 9 which define the ends of an annular chamber A between the sleeve 3 and the hollow rotatable casing 2. One of the shoulders 8 is shaped to form the track for a ring of rolling elements which, in the example illustrated, are balls, 10, forming a rolling element bearing in combination with an inner ring 11 which is axially locked to the rotatable casing 2 by means of a circlip 12.

The two radially inwardly directed shoulders 8 and 9 form, together with the inner ring 11 and with a radially outwardly directed shoulder 2$l a$ of the rotatable casing 2 respectively, two annular housings 14, 14' in which are held respective floating flexible washers 13, 13' which seal the chamber A against loss of fluid as they are thrust against their housings as a result of the pressure exerted upon them by the fluid when it enters the sleeve. The housings 14, 14' are recessed in order to prevent the washers from becoming displaced accidentally.

Figure 2:
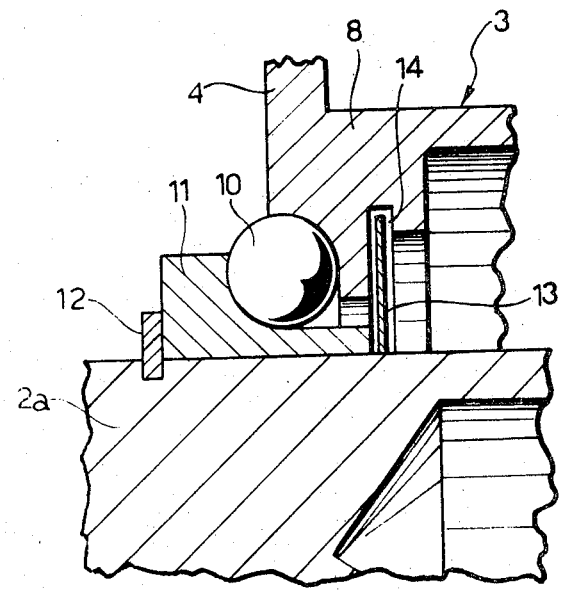
FIG. 2 is a partial axial section on an enlarged scale of part of the embodiment of FIG. 1.

The washers 13, 13' as illustrated in the enlarged detail in FIG. 2, are merely located but not held in their respective housings so as to prevent possible wear through excessive rubbing of the parts. Because of their flexibility, these are thrust by the fluid pressure against the sides of their respective housings and are deformed to conform to the shape of their housings and to any possible irregularities in the sides of the housings, such as might be due to inaccuracies in machining between the fixed part 4 and the rotating part 11.

In addition to the support offered by the bearing formed by the rolling elements 10 at one end of the sleeve 3 there is another rolling element bearing comprising a ring of rolling elements 15, housed between two metal rings 16, 17 the ring 17 of which is restrained by a spring 18, and the ring 16 of which has a flange 16$a$ which abuts against the end of the hollow casing 1.

Figure 3:
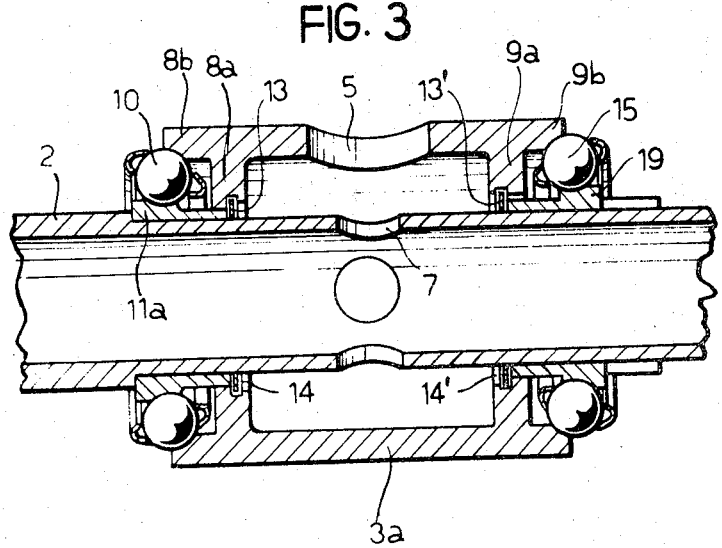
FIG. 3 is an axial section of a second embodiment of the invention.

In the second embodiment, shown in FIG. 3, there is a sleeve 3$a$ which is fitted at its ends 9$b$, 9$b$ with respective rolling element bearings each comprising a ring of rolling elements, in this case balls 10, 15, cooperating in tracks formed on the end faces of the sleeve 3$a$ and in two rings 11$a$ and 19 which are fitted over the rotatable casing 2. The sleeve 3a also has two inwardly directed radial shoulders 8a, 9a which form, with the rings 11a and 19, two housings 14, 14' within which flexible sealing washers 13, 13' are located in the same manner as in the embodiment of FIG. 1.

The device described is especially useful for feeding fluid under high pressure to the steering column of a motor vehicle as part of a safety device against frontal impact which operates by the instantaneous blowing up of small elastic balls. In this case the rotatable casing 2 is the steering rod and the fixed outer casing 1 is the steering column case.

Under normal operating conditions the fluid under pressure is not fed to the sleeve so that the movable part 2 can rotate freely about its longitudinal axis with respect to the fixed part 1, without casuing wear on the sealing washers 13, 13' which are only loosely located in their housings. It is only in the case of an emergency, that is upon impact, that the fluid is fed under high pressure to the sleeve 3 and it then has to reach the balls via the cavity in the steering rod 2, without escaping from the sleeve ends, which is prevented by the flexible sealing washers.

I claim:

1. A device for conveying fluid under pressure into a hollow rotatable casing having an opening in the side wall thereof, said device comprising:
   a fixed sleeve surrounding said hollow rotatable casing, extending axially on either side of said opening in the side wall thereof and defining a chamber between itself and said hollow rotatable element,
   means defining at least one opening in the side wall of said sleeve,
   at least one rolling element bearing between said fixed sleeve and said hollow rotatable casing at one end of said sleeve,
   radially inwardly directed shoulder means integral with said sleeve at each end of said sleeve,
   each of said shoulders having a recess therein, each recess having a pair of radially extending side walls and an axially extending bottom wall,
   a flexible washer in each recess freely rotatable on said casing and having clearance between the outer periphery of said washer and said bottom wall,
   each of said recesses having an axial width greater than the axial width of said washer whereby said washer is freely rotatable in said recess but restrained against axial displacement from said recess,
   annular abutment means secured to said casing and disposed axially outwardly of each of said washers and extending radially in close proximity to said shoulder means, and
   said washers being deformable whereby upon a sudden increase in fluid pressure in said chamber said washers are axially forced apart and deformed against the side walls of said recesses and said abutment means to seal said chamber against loss of fluid from the ends of said sleeve.

2. The device of claim 1 wherein said rolling element bearing comprises:
   a ring of rolling elements,
   an annular element forming one track for said ring of rolling elements, said annular element being mounted on said hollow rotatable casing for rotation therewith, the end of said sleeve being shaped to form the other track for said rolling element of said rolling element bearing.

3. The device of claim 1 wherein there is a rolling element bearing at each end of said fixed sleeve, each end of said fixed sleeve being shaped to form one track for the rolling elements of said rolling element bearings, and
   respective annular elements fixed to said hollow rotatable casing for rotation therewith forming the other tracks for said rolling elements of said rolling element bearings.

* * * * *